(12) United States Patent
Petrillo et al.

(10) Patent No.: US 6,327,546 B1
(45) Date of Patent: Dec. 4, 2001

(54) METHOD AND APPARATUS FOR INDEPENDENTLY CALIBRATING EVENT DETECTORS

(75) Inventors: Michael J. Petrillo; Donald R. Wellnitz, both of Pleasanton, CA (US); Hugo Bertelsen, Aalborg (DK); Thomas E. Scharf, San Jose, CA (US)

(73) Assignee: ADAC Laboratories, Milpitas, CA (US)

( * ) Notice: Subject to any disclaimer, the term of this patent is extended or adjusted under 35 U.S.C. 154(b) by 0 days.

(21) Appl. No.: 09/211,996

(22) Filed: Dec. 14, 1998

(51) Int. Cl.[7] .................................................. G01D 18/00
(52) U.S. Cl. ............................................. 702/89; 378/207
(58) Field of Search ................................. 702/38–40, 79, 702/85, 89, 90, 104, 106, 107, 125, 176–178, 57, 66, 71, 78, 117, 124, 183, 189, 193; 378/207; 250/363.09

(56) References Cited

U.S. PATENT DOCUMENTS

| | | | |
|---|---|---|---|
| 3,906,213 | * 9/1975 | Meriaux et al. | 702/79 |
| 4,058,836 | * 11/1977 | Drewery et al. | 348/620 |
| 4,079,257 | * 3/1978 | Jatteau et al. | 250/363.07 |
| 4,096,575 | * 6/1978 | Itoh | 702/89 |
| 4,178,064 | * 12/1979 | Mrdjen | 359/215 |
| 4,809,172 | * 2/1989 | Hopinson et al. | 378/4 |
| 5,319,656 | * 6/1994 | Geller | 372/29.014 |
| 5,608,221 | * 3/1997 | Bertelsen et al. | 250/363.03 |
| 5,703,489 | * 12/1997 | Kuroe | 324/601 |
| 6,148,057 | * 11/2000 | Urchuk et al. | 378/18 |

* cited by examiner

*Primary Examiner*—Hal Wachsman
*Assistant Examiner*—Manuel L. Barbee
(74) *Attorney, Agent, or Firm*—Jordan M. Becker

(57) ABSTRACT

An event detector method and apparatus are described. One embodiment includes a first detector that includes a plurality of zones. Each zone includes a plurality of detector devices, wherein each zone generates a zone trigger signal when an event is detected by a detector device in the zone. The embodiment further includes a first energy source coupled to the first detector, wherein when the first energy source is active, events occur that are detectable by the first detector. A calibration circuit is coupled to the first detector, to perform timing calibration of zone trigger signals of zones of the first detector with respect to timing of a reference zone trigger signal of the predetermined reference zone of the first detector, wherein the zone trigger signals and the reference zone trigger signal are generated when an event is detected.

21 Claims, 10 Drawing Sheets

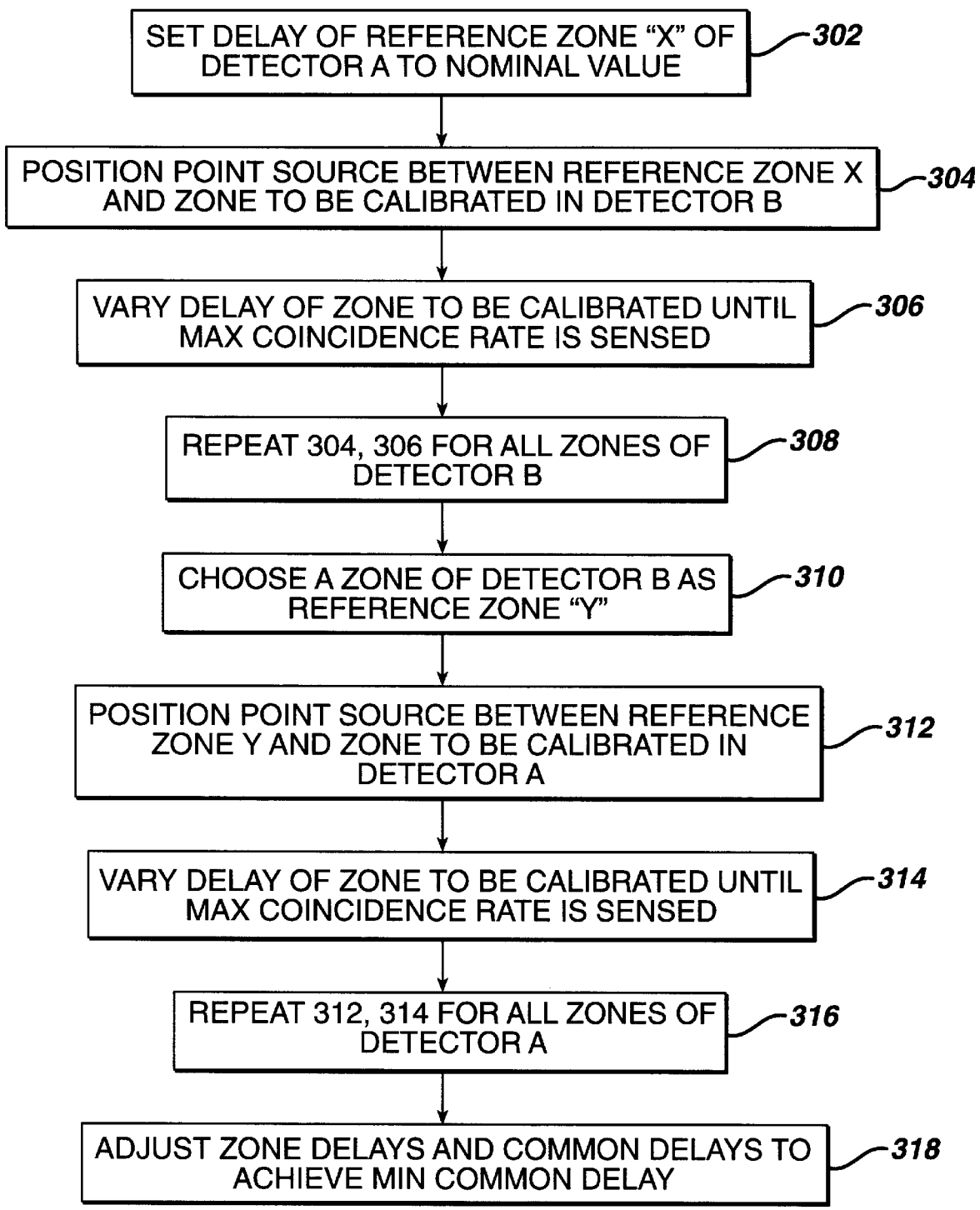

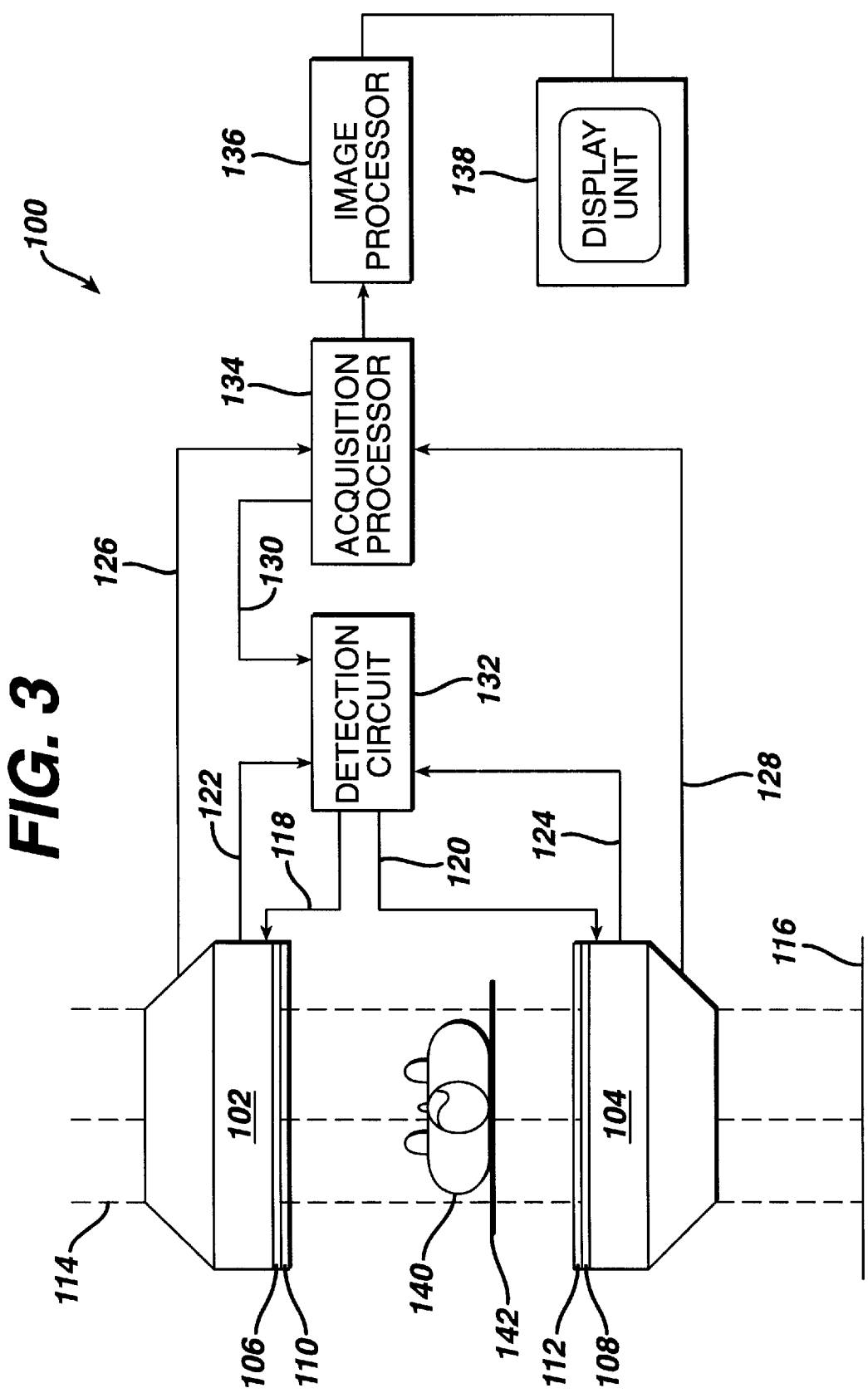

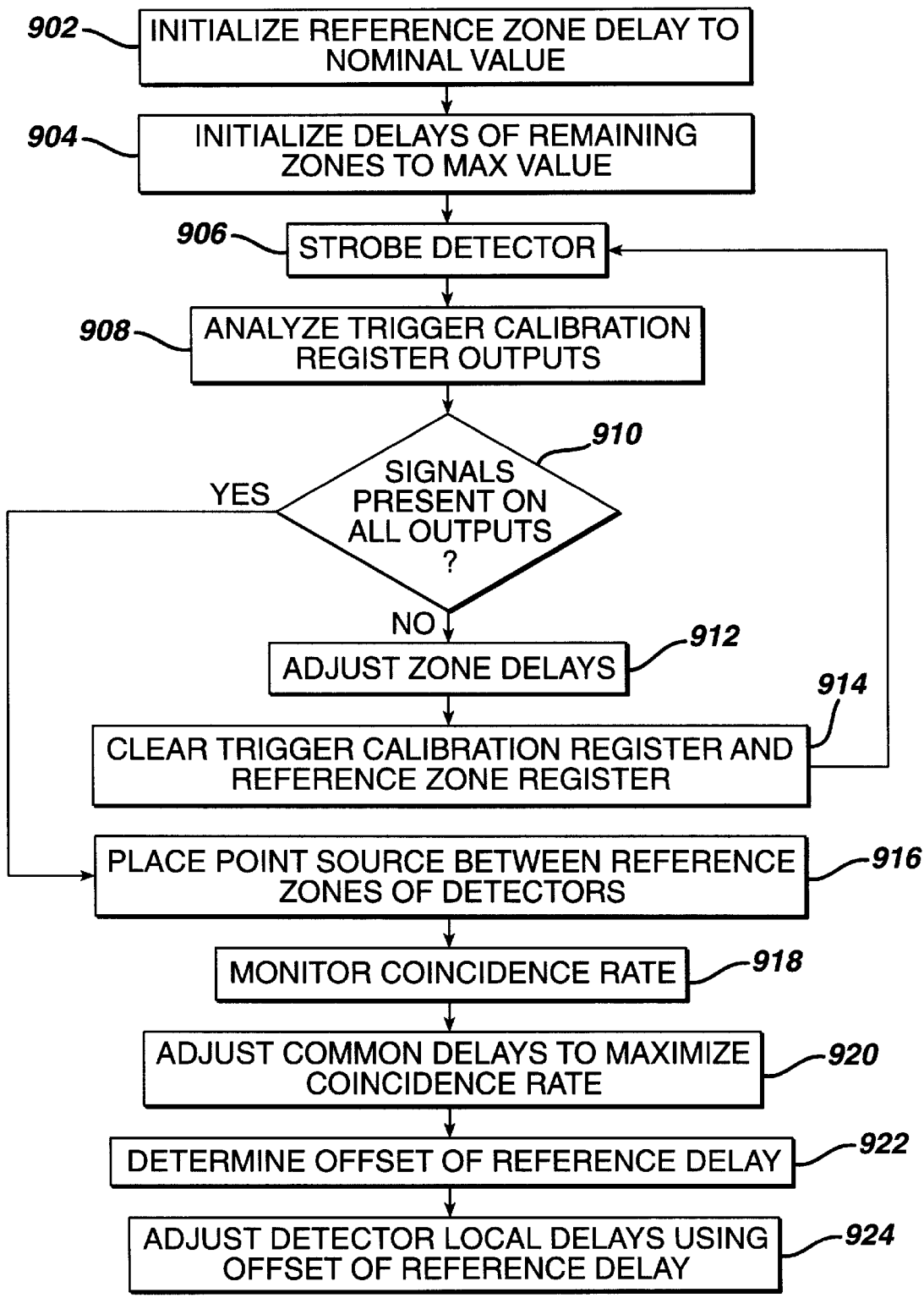

METHOD AND APPARATUS FOR INDEPENDENTLY CALIBRATING EVENT DETECTORS

FIELD OF THE INVENTION

The present invention is in the field of instruments that detect events involving small particles. More particularly, the present invention is in the field of calibrating instruments that detect events involving small particles.

BACKGROUND OF THE INVENTION

Many types of equipment are designed to detect physical events such as particle-matter interactions. Event detection is widely used in scientific research and in medicine. An example of useful event detection equipment is a nuclear medicine camera, also referred to as a gamma camera. Such cameras can aid in locating diseased tissue, such as tumors, in the body.

Some conventional nuclear medicine imaging systems have two or more detectors. The detectors are usually planar and include an array of detector devices such as photo multiplier tubes (PMTs). The detectors arrays are positioned above different sides of a patient. Gamma cameras can operate in different modes. For example, some nuclear medicine cameras perform single photon emission computed tomography (SPECT) in which information from a single detector is used to produce information. Other nuclear medicine cameras perform positron emission tomography (PET) in which the detection of two scintillation events, one in each of two detectors that occur 180° apart, are used to compute imaging information. In a PET system, detectors detect scintillation events that result when a photon of a photon pair collides with a crystal.

Before the gamma camera is used in PET mode, the patient is injected with a radiopharmaceutical, such as Flouro Deoxi Glucose (FDG). The radiopharmaceutical emits positrons that interact with electrons in the body. As a result of the interaction, the positrons are annihilated and gamma rays, including photon pairs, result. Photon pairs leave the scene of the interaction in directions of travel that are 180° apart from each other. When a photon comes in contact with a crystal of a detector, a scintillation event occurs. The scintillation event is detected by a photo detector device of the detector creating analog information. The analog information is digitized and processed by electronics and software to produce image information about objects such as tumors in the body.

In SPECT mode, the patient is injected with a radiopharmaceutical and emissions from the patient are then detected independently by detectors of the gamma camera, rather than detecting coincident events. When a trigger signal from a detector is received by processing hardware and software, the outputs of the PMTs are integrated to determine the energy associated with the event. Integration occurs during a constant time window. Therefore, if different trigger signals line up differently with respect to the timing window, some events will be processed to show energy in one area of a spectrum, and another event in another area of the spectrum. All energy spectra are added to generate a global energy spectrum for the system. The narrower the energy distribution, the more accurate the spectrum will be. Ideally, energy resolution should depend primarily on the spectra of the crystal and on the PMT energy. Some inaccuracies are unavoidable, such as variance in process behavior in the crystal by location, and noise in the PMT that prevents signals captured from each gamma ray from being the same. Variations in trigger signal arrival time add to inherent inaccuracies of the SPECT method because they affect energy resolution.

Another example of event detection equipment is a Compton camera. A Compton camera examines coincident events between two detectors to determine the well-known Compton scattering angle associated with an interaction of photons with matter. Known equations are used to find the Compton angle, which in turn is used to calculate the position of the event in the body.

Typical gamma camera, regardless of the mode in which they are operated, include detectors with multiple devices such as PMTs. For various reasons, the propagation time of trigger signals indicating detection of events varies between PMTs. One factor contributing to propagation time variance is the fact that PMTs vary physically in ways that affect their response times. Another factor is the variance in the length of cables used to carry signals associated with different PMTs. Yet another factor is crystal response time variance by area. If the trigger signal is received by processing hardware and software significantly later than the event detected, inaccuracies may result. Inaccuracies may include false detection indications, and images with poor resolution. Therefore, it is critical to calibrate the timing of trigger signals so that they portray, as accurately as possible, what is actually occurring in the tissue of the patient.

Proper calibration of trigger signals can be important in both PET and SPECT systems, as well as systems that include Compton cameras. Currently, calibration is performed on PET systems by positioning a radioactive source between detectors and monitoring rates of coincident events. Such methods of calibration are often time consuming and may be imprecise because the steps performed are not accurately repeatable. Currently, no calibration is known to be performed on detectors of systems, such as SPECT systems, that do not operate by detecting coincident events.

Detector calibration is especially critical in systems, such as PET systems and systems using Compton cameras, that rely on detection of coincident events to produce imaging data. If the collision of one photon of a photon pair with one detector is not reported at the same time as the collision of the other photon of the photon pair with another detector, the coincident event will be missed. Techniques currently exist for calibrating PET systems, but these techniques have several disadvantages. Current techniques are complex and not accurately repeatable. In addition, current calibration operations take a relatively long time to perform.

FIG. 1 is a block diagram of a prior PET coincidence detection system 200. System 200 includes two detectors 266 and 268. Detector 266 is divided into four zones 266 (1), 266 (2), 266 (3), and 266 (4). Each of zones 266 (1–4) include multiple PMTs. Zone 266 (1) and its connected components operate similarly to other zones in detector 266 and corresponding zones in detector 268. Zone 266 (1) will be described as an example of how a zone of a detector operates. When any PMT in zone 266 (1) detects a scintillation event resulting from a collision of a photon with the crystal of detector 266 (not shown), an analog signal is sent to summing circuit 201. Summing circuit 201 receives signals from all of the PMTs in zone 266 (1) and sums their amplitudes in a known manner. Summing circuit 201 outputs a signal to constant fraction discriminator (CFD) 221. CFD 221 operates as a trigger detector in an amplitude independent manner. CFD 221 outputs a zone trigger signal to programmable delay 241. Programmable delay 241 is typically controlled by a processor of system 200 and is used to vary the delay of the trigger signal output by CFD 221 during calibration of system 200. Zones 266 (2), 266 (3), and 266 (4) operate in the same manner as zone 266(1), each outputting a signal from their respective programmable delay circuits indicating that an event has been detected. The outputs of programmable delays 241, 242, 243, and 244 are input to OR gate 256. Detector trigger signal 270 is active on the output of OR gate 256 when any event is detected in a zone of detector 266. Detector trigger signal 270 is input to common delay $CD_A$ 260, which is associated with a detector A. $CD_A$ 260 is a programmable delay circuit that is used to vary the delay of detector trigger signal 270 with respect to detector trigger signal 272. Adjusted detector trigger signals 274 and 276 are input to coincidence detection circuit 264. Coincidence detection circuit 264 typically performs an operation such as an AND operation for determining when scintillation events have been detected simultaneously in detectors 266 and 268.

Programmable delays 241, 242, 243, and 244 are adjusted to compensate for variances such as response time of different PMTs, different cable lengths between zones, and different crystal response times between zones. In a typical prior art method, which will be described below, delays 241–244 are adjusted, as well as delays 251–254 associated with detector 268. Then, common delays $CD_A$ 260 and CDB 262 are adjusted for the purpose of synchronizing the global, or common, delays of signals 270 and 272 with respect to each other. Programmable common delay circuits $CD_A$ 260 and CDB 262 adjust for delays due to cable lengths between OR gates 256 and 258 and coincidence detection circuit 264.

FIG. 2 is a flow diagram showing steps of a prior art calibration operation that may be applied to a system such as system 200. At steps 302, the delay of a single zone X of one of the detectors, called detector A, is set to a nominal value. The nominal value is a combination of an individual delay of the single zone and a common delay between the two detectors. The nominal value of the delay of zone X is typically determined by calculating known cable delays and component response delays in the path of zone X.

Zone X is used as a reference zone to set delays of detector B zones. At step 304, a point source is positioned between zone X and a zone of detector B. Then, at 306, the delay of the zone of detector B is adjusted until a maximum coincidence rate is sensed. As the point source radiates, causing coincident events, a processor receiving data from detectors A and detector B calculates the rate at which coincident events occur. When the maximum rate is sensed, it is assumed that the trigger signal generated by detector A and detector B have close to the same flight times. Steps 304 and 306 are then repeated for each of the four zones in detector B, as shown at 308.

At 310, a zone of detector B is chosen as a reference zone Y. A point source is then positioned at 312 between zone Y of detector B and a zone of detector A to be calibrated. At 314, the delay of the zone of detector A is adjusted until a maximum coincidence rate is sensed. Steps 312 and 314 are repeated until the our zones of detector A are calibrated, as shown at 316. Finally, the individual zone delays and common delays are set for each of the two detectors at 318 to achieve the smallest amount of common delay.

The disadvantage of the method shown in FIG. 2 is the necessity of adjusting the position of the point source between detectors A and B for each zone to be calibrated. A disadvantage is that the exact positions of the point source with respect to detectors 266 and 268 are not repeatable with a high level of accuracy. This makes diagnosis of system behavior difficult and inaccurate. Another disadvantage is the length of time the calibration process takes. The detectors shown each include only four zones and the calibration operation typically requires approximately thirty minutes to complete. Detectors having more zones than four would be more efficient in detecting coincident events, but calibration time of such detectors with the prior art method of FIG. 2 would increase as the number of zones increased. For example, the number of measurements required by the method of FIG. 2 is:

(number of zones in detector A)+(number of zones in detector B)−1=7

If each detector had 14 zones, 27 measurements would then be required by the method of FIG. 2.

SUMMARY OF THE INVENTION

A method and apparatus for independently calibrating event detectors is described. One embodiment includes two detectors that each include multiple photo detector devices arranged into multiple zones. Each zone generates a trigger signal when an event is sensed by a photo detector device in the zone. The propagation times of trigger signals of respective zones are calibrated with respect to each other without the necessity of positioning a radioactive source between the two detectors and without the necessity of monitoring coincident events involving the two detectors. In one embodiment, at least one detector that has multiple photo multiplier tubes (PMTs) divided into a relatively large number of zones. The detector includes a light source coupled to the detector. In a calibration operation, the light source is pulsed to generate trigger signals from zones of the detector. Trigger signals of all respective zones of the detector are simultaneously examined by a calibration circuit, and information collected by the calibration circuit is used to adjust delays of trigger signals of the detector with respect to each other.

BRIEF DESCRIPTION OF THE DRAWINGS

FIG. 2 is a flow diagram of a prior art calibration method.

FIG. 3 is a block diagram of one embodiment of a nuclear medicine imaging system.

FIG. 10 is a flow diagram showing steps of one embodiment of a calibration operation.

DETAILED DESCRIPTION OF THE PRESENT INVENTION

Figure 1:
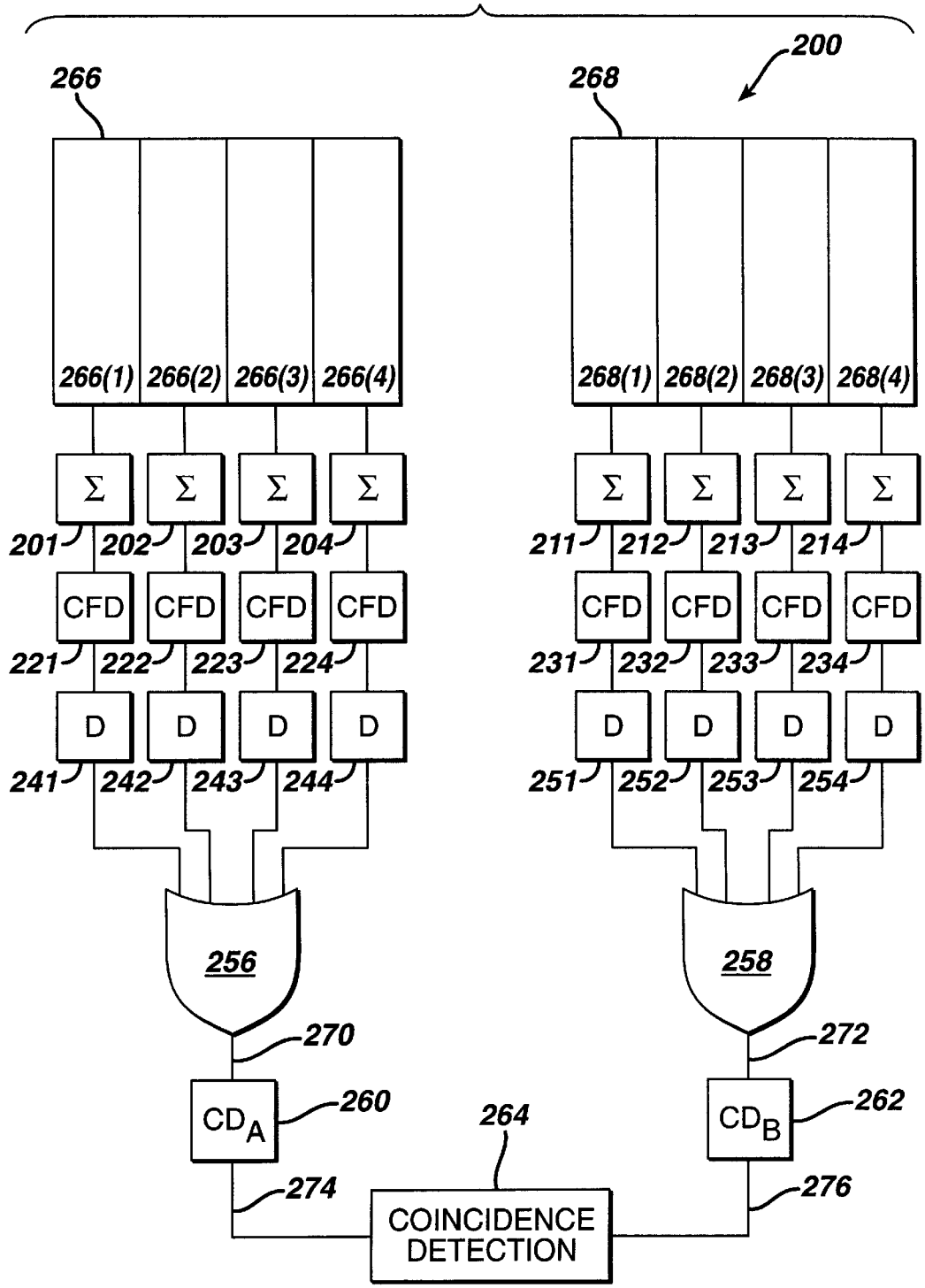
FIG. 1 is a block diagram of a prior art event detection system.

A method and apparatus for independently calibrating an event detection array is described. One embodiment includes a detector of multiple photo multiplier tubes (PMTs) is divided into seventeen zones. A calibration circuit calibrates delays of zone trigger signals of the detector independently of any other detector and without the necessity of placing a radioactive source.

FIG. 3 is a block diagram of one embodiment of nuclear medicine imaging system 100. System 100 is an example of a type of system that includes the apparatus and method of the present invention. System 100 is operable in either a SPECT mode or a PET mode. Embodiments of the present invention are equally applicable to other systems, such as systems that operate in the SPECT mode only, systems that operate in the PET mode only, systems that operate using Compton cameras, or other systems that detect events. System 100 includes detector assembly 102 and detector assembly 104 arranged 180° apart on opposite sides of patient 140. Detector assemblies 102 and 104 each include circuitry for generating detector trigger signals 122 and 124, which will be explained more fully below. Detector assembly 102 and detector assembly 104 each include multiple PMTs (shown and described below) in a planar array and are coupled to glass plates 106 and 108 respectively. Glass plates 106 and 108 must have good optical properties, that is, they must contain few flaws. Pyrex is an example of an acceptable material for glass plates 106 and 108. Crystals 110 and 112 are attached to glass plates 106 and 108 respectively. In one embodiment, crystals 110 and 112 are each single sodium iodide (NaI) crystals doped with thallium (Tl). Scintillation events are produced by the collision of photons from patient 140 with crystals 110 and 112. When system 100 operates in a PET mode, coincident events are detected, that is, events in which annihilation of a positron that has interacted with an electron in the body of patient 140 results in the emission of a photon pair at an angle of 180° apart from patient 140. One of the photon pair collides with crystal 110 and one of the photon pair collides with crystal 112. Gantry 114 positions event detector assemblies 102 and 104 about patient 140. Patient 140 rests on table 142, which, with gantry 114, is supported by base 116.

When a photon from patient 140 collides with crystal 110, circuitry of event detector assembly 102 generates a detector trigger signal 122 from a detector. A detector trigger signal 124 is similarly generated by event detector assembly 104. Detector trigger signals 122 and 124 are transmitted to detection circuit 132 which processes the signals as required dependent upon the mode of operation. The mode of operation, either SPECT or PET, is determined by mode signal 130 transmitted from acquisition processor 134. Signals 118 and 120 are valid event trigger signals that indicate "valid" event detection. Valid event trigger signals 118 and 120 are transmitted to event detector assembly 102, event detector assembly 104 or both, as appropriate to the mode of operation. Valid event trigger signals 118 and 120 are used to trigger integrators associated with preamplification and digitization circuitry of respective event detector assemblies. In one embodiment, detection circuit 132 includes a detection processor used to process signals during operation of system 100. Detection circuit 132 includes operational circuitry not pertinent to the present invention. Detection circuit 132 includes circuitry for performing calibration according to the present invention, including a coincidence timing circuit and a trigger calibration circuit to be described in more detail below.

Spatial coordinate signals 126 and 128 transmit spatial coordinate information from respective event detector assemblies to acquisition processor 134. Acquisition processor 134 uses spatial coordinate signals 126 and 128 to produce input to image processor 136. Image processor 136 produces an image of tissues in patient 140 showing a growth such as tumors. The image produced by image processor 136 is displayed on display unit 138.

Figure 4A:
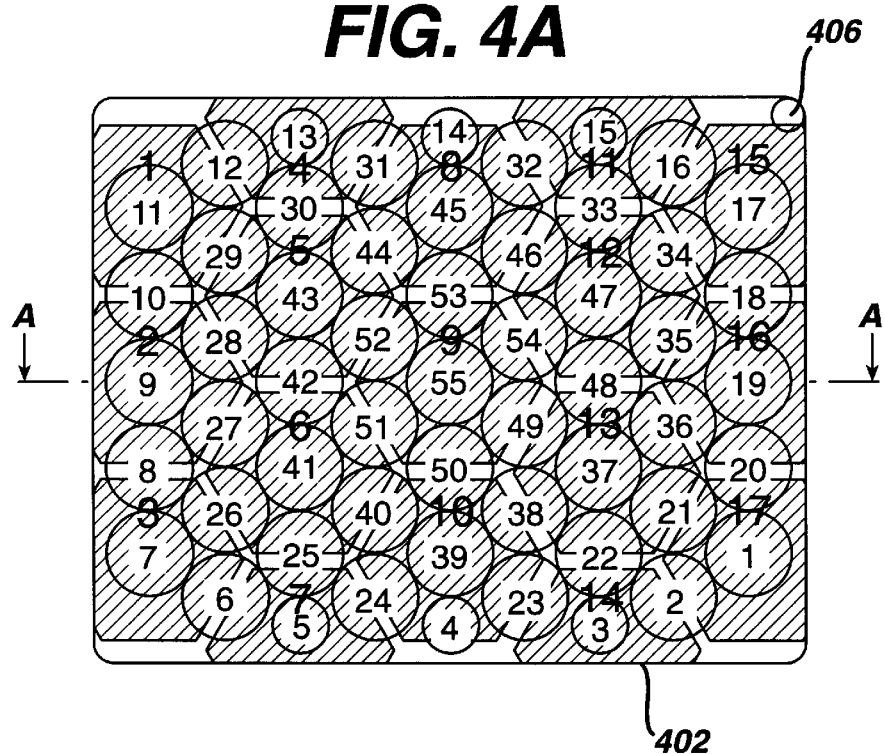
FIG. 4a is a diagram of one embodiment of a detector showing detector zones.

FIG. 4a is a diagram of one embodiment of a detector 402. FIG. 4a is a view of the planar surface of detector 402, which is the surface typically facing the patient. Detector 402 has approximate dimensions of 17 inch by 21 inches. The surface shown in FIG. 4a is the surface that is coupled to a glass plate such as glass plate 106. Detector 402 includes PMTs 1–55 divided into zones 1–17 as shown. Each zone includes one entire PMT and portions of one or more PMTs that are shared with other zones. For example, zone 5 includes PMT 43 and a portion of PMTs 28, 29, 30, 42, 44, and 52. PMTs are shared between zones to maximize the possibility of event detection. For example, an event may occur at a location such that PMT 52 receives a very weak analog indication of the event. In the case where the location of the event is approximately zone 1, PMT 52 would not contribute enough signal for a detection trigger to be generated in zone 9, but would contribute to a detection trigger generated from zone 5.

Detector 402 is an improvement over prior art detectors such as detectors 266 and 268 of FIG. 1. Detector 402 includes 17 zones and 55 PMTs compared to array 266, for example, which includes four zones and 55 PMTs. With a larger number of zones, the likelihood of detecting valid coincidence events is increased, because the "dead time" of zones within the array is reduced. Many events may be detected by a detector that are not coincident events. The smaller the number of zones, the greater the dead time associated with any one zone. For example, in an extreme case of a detector having only one zone, any event sensed would cause the detector to be "dead" for the period it takes to process the signal and determine that it does not really indicate a coincident event. Typically, coincident events are approximately 1% of gamma ray collision events in a PET system, so that with a four zone detector, as in the prior art, an average of 50% of a detector is dead at any one time. Detector 402, on the other hand, includes 17 zones, making it more available to detect coincident events. Therefore, detector 402 collects data to produce an accurate image more efficiently than the prior art.

Internal light source 406, in this embodiment, is a light emitting diode (LED) coupled to a glass plate that is, in turn, coupled to detector 402. LED 406 is used to artificially stimulate PMTs of detector 402 such that each of PMTs 1–55 produce a signal that contributes to zone trigger signals generated by each of zones 1–17 simultaneously. The location of LED 406 could vary, in other embodiments, from that shown in FIG. 4a. For example, LED 406 could be located along an edge of the detector rather than at a corner. It is only important that LED 406 stimulate all PMTs of the detector simultaneously. As will be described further below, the simultaneously generated zone trigger signals are used to independently calibrate detector 402.

Figure 4B:
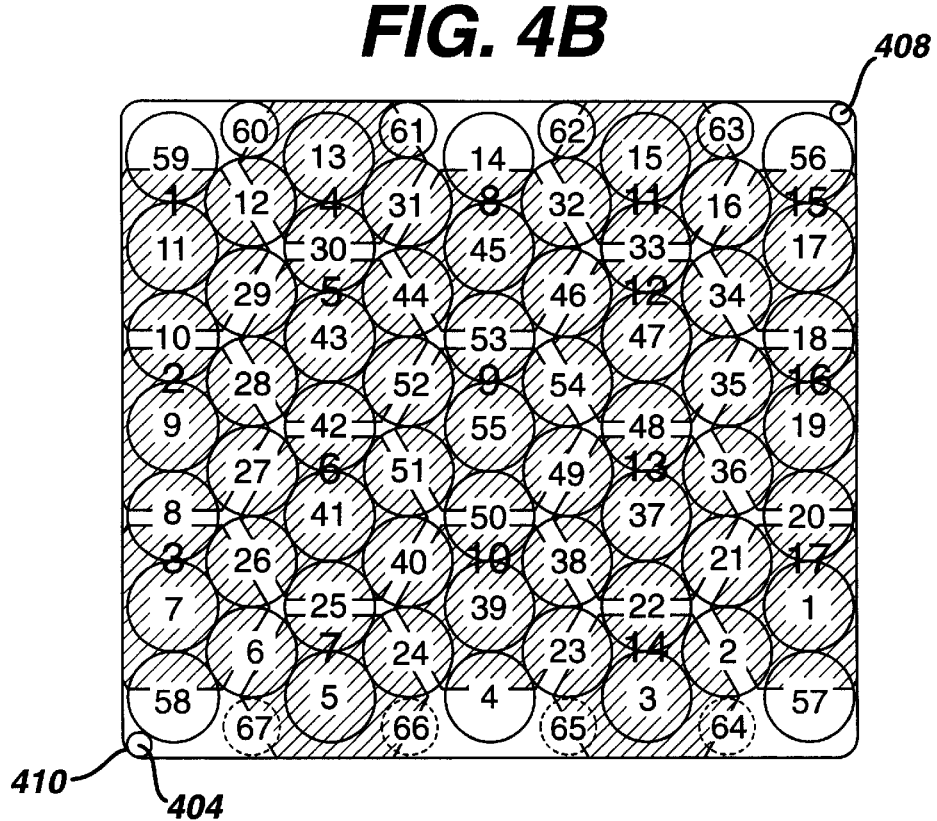
FIG. 4b is a diagram of one embodiment of a detector showing detector zones.

FIG. 4b is a diagram of detector 404 of one embodiment. Detector 404 has a greater field of view than detector 402, having dimensions of approximately 25 inches by 29 inches. Detector 404 includes 17 zones of PMTs, like detector 402, but includes 67 PMTs. In this embodiment, two LEDs 408 and 410 are coupled to opposing corners of detector 404 to provide enough light to stimulate each of PMTs 1–67 simultaneously. Other embodiments could include three or more LEDs, as appropriate.

LEDs 406, 408, and 410 are coupled to respective glass plates of detectors 402 and 404 at an angle that yields maximum internal reflection. Light injected into the glass plate by an LED reflects within the glass and propagates while imperfections in the glass cause the light to escape and stimulate detectors in the area.

Figure 5:
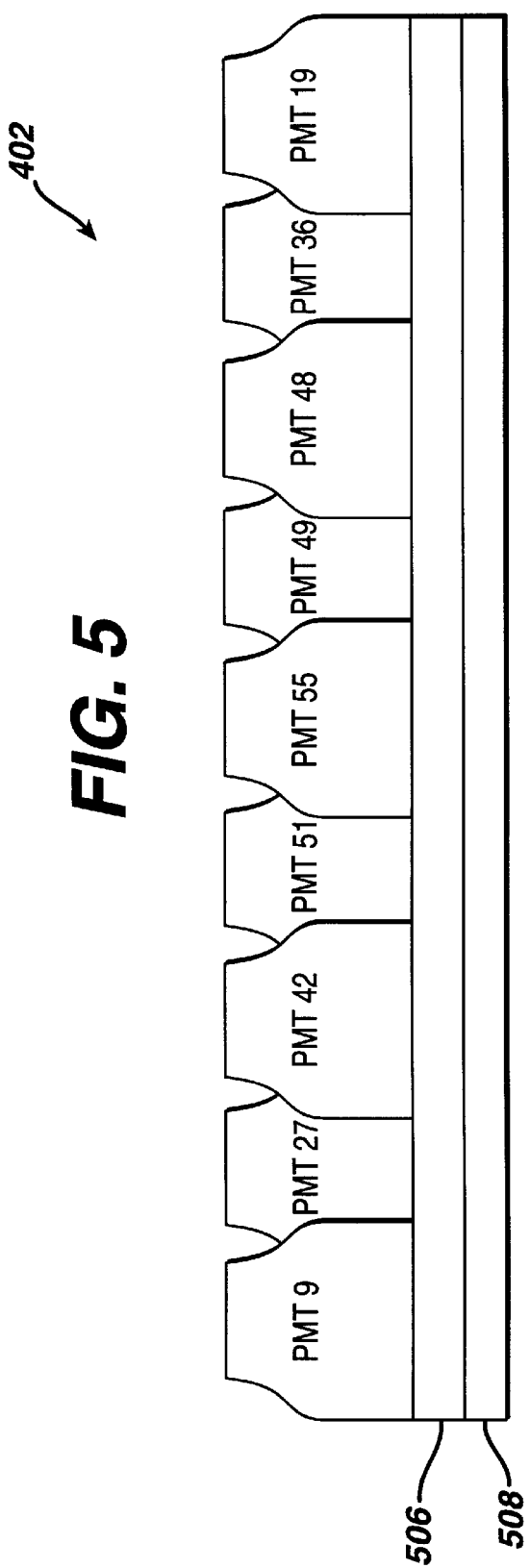
FIG. 5 is a diagram of one embodiment of a detector.

FIG. 5 shows cross section AA of detector 402 of FIG. 4a. The PMTs shown are coupled to glass plate 506, which is in turn coupled to crystal 508.

Figure 6:
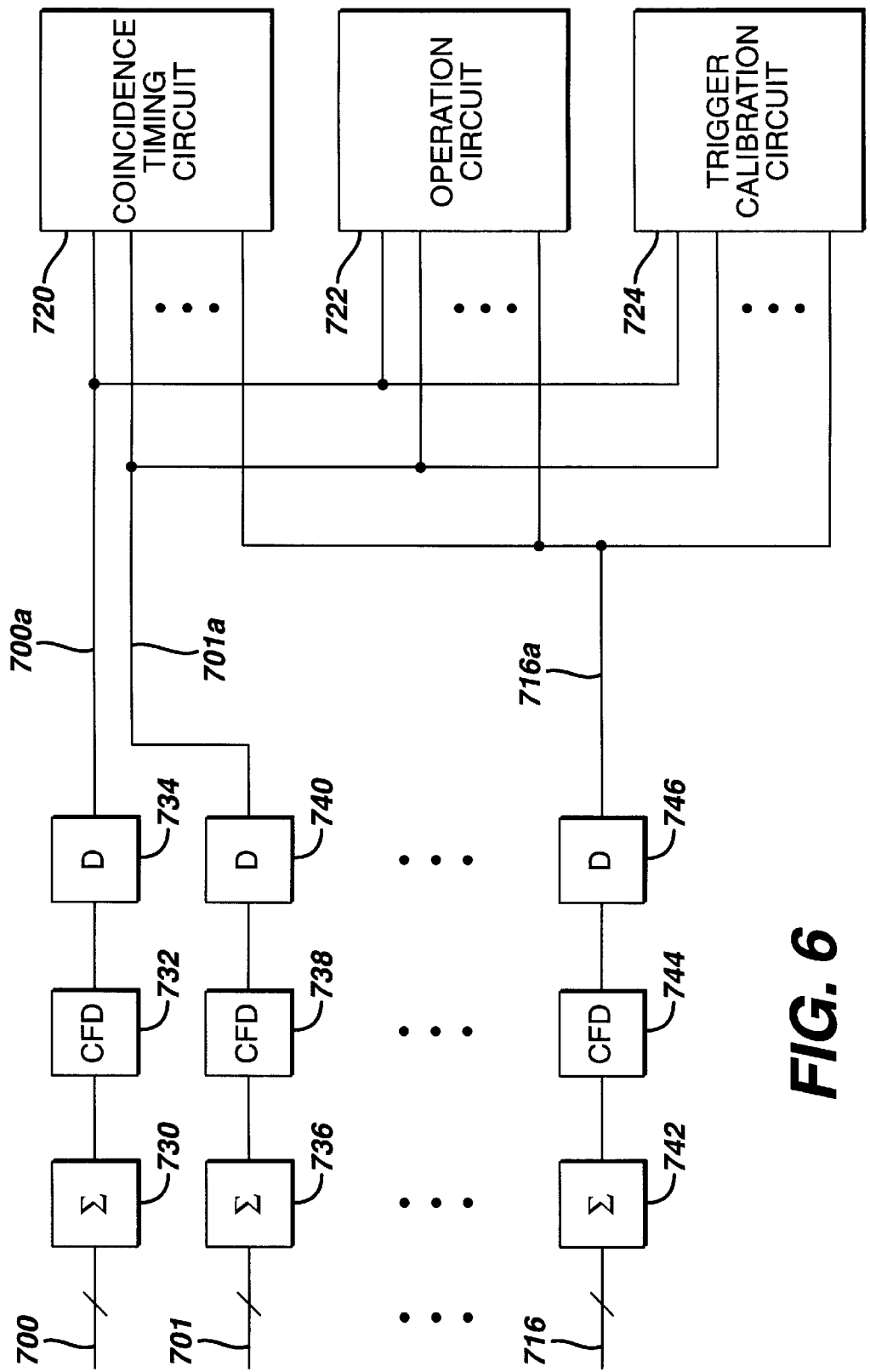
FIG. 6 is a circuit diagram of one embodiment of a portion of an event detection system.

FIG. 6 is a block diagram of circuitry of one embodiment used to process signals generated by PMTs of a detector. Signal lines 700 are a group of signal lines associated with a particular zone of a detector. Signal lines 700 each carry a signal from a single PMT of the zone, and a signal is active when a PMT is stimulated. A PMT may be stimulated by a photon interacting with a crystal coupled to the detector, or "artificially" stimulated by a light source such as LEDs 406, 408 or 410. Signals on line 700 are sent to summing circuit 730, which adds the amplitudes of signals input to it. Summing circuit 730 outputs a signal to CFD 732 which outputs an event trigger signal independent of the amplitude of the incoming signal. As is known, a CFD circuit produces a trigger based upon a constant fraction of an overall pulse rather than an amplitude of the pulse. For example, CFD circuit 732 examines the area of the pulse in the region of 10% to 90% of its rise time. The trigger signal output by CFD 732 is then input to programmable delay 734. Programmable delay circuit 734 is controllable by a processor, in one embodiment a detection processor of detection circuit 132, to adjust flight time of zone event trigger signal 700a. Zone event trigger signal 700a may be used by coincidence timing circuit 720, signal processing circuit 722, and/or trigger calibration circuit 724. Signal processing circuit 722 receives zone event trigger signal 700a for the purpose of eventually producing an image. For example, signal processing circuit 722 includes positioning circuitry for determining a source location of an event and integrator circuitry for integrating signal energy. Specific details of signal processing circuit 722 are not germane to the present invention.

Zone event trigger signal 700a is input to coincidence timing circuit 720 which uses it to calibrate the timing of trigger signals between two arrays, as will be explained in more detail below. Zone event trigger signal 700a is input to trigger calibration circuit 724, which uses zone event trigger signal 700a for calibrating the timing of event zone trigger signal 700a with respect to other zone event trigger signals of the same detector, such as signal 701a and 716a.

Each of the 17 zones of the detector (such as, for example, detector 402) includes signal lines such as signal lines 700, a summing circuit such as summing circuit 730, a CFD such as CFD 732, and a programmable delay such as programmable delay 734. Signal lines 701 are shown, as are signal lines 716. Not shown are signal lines 702–715. Signal lines 701 carries signals from PMTs of a corresponding zone, which are processed by summing circuit 736, CFD 738, and programmable delay 740, to produce zone event detection signal 701a. Similarly, signal lines 716 carries signals from corresponding zone 17, which are processed by summing circuit 742, CFD 744, and programmable delay 746 to produce zone event detection signal 716a. Each of coincident timing circuit 720 and trigger calibration circuit 724 receive a zone event trigger signal for each of 17 zones of a detector.

Figure 7:
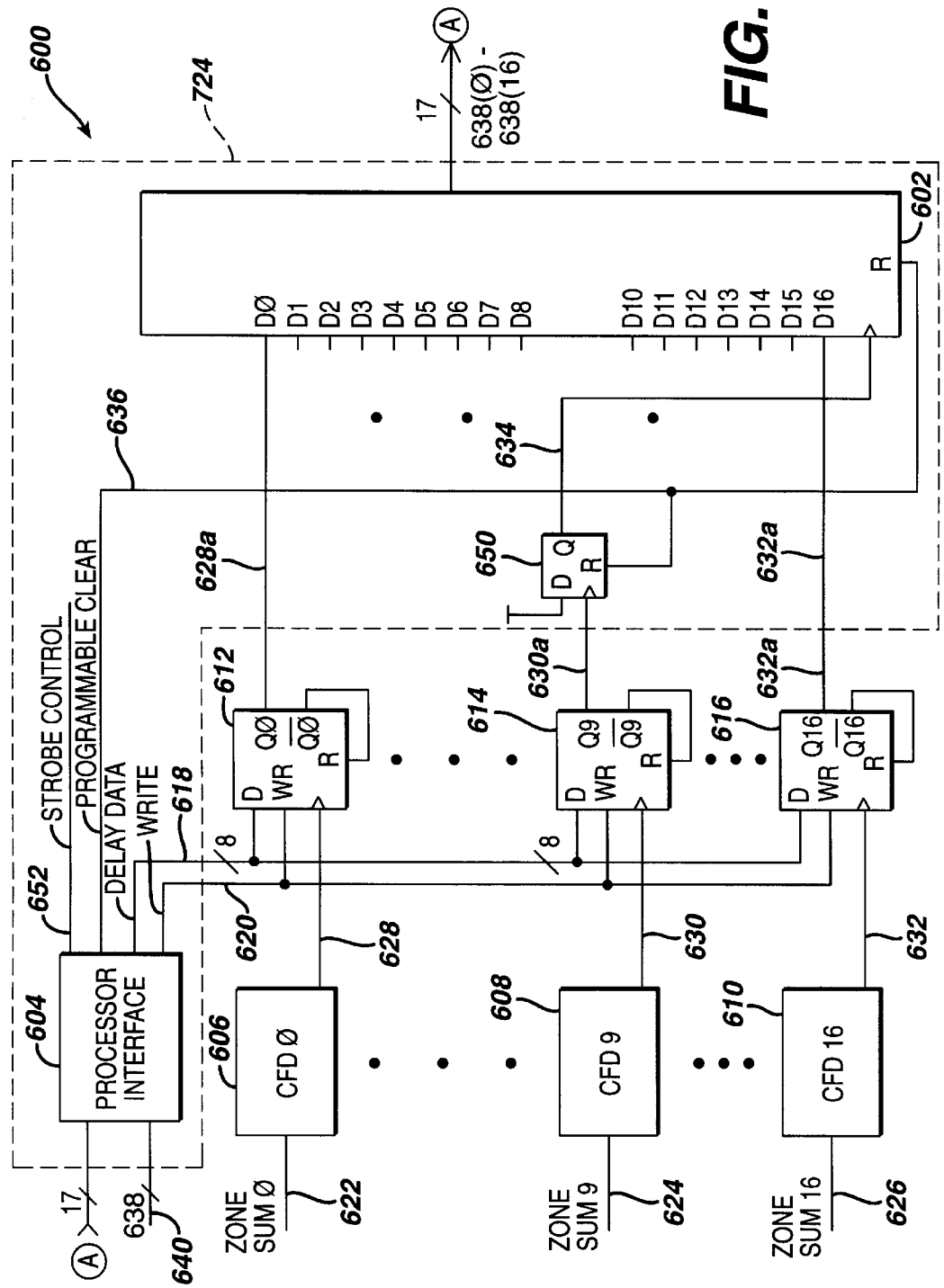
FIG. 7 is a circuit diagram including trigger event detection circuitry of one embodiment.

FIG. 7 is a block diagram of circuitry, including trigger calibration circuit 724 that is used, according to one embodiment, for independently calibrating a detector. FIG. 7 shows circuitry associated with a single detector such as detector 402. Other detector(s) of the system may be assumed to include identical circuitry. FIG. 7 shows CFD circuits corresponding to CFD circuits 732, 738, and 744 of FIG. 6 as well as more detail of programmable delay circuits corresponding to programmable delay circuit 734, 740 and 746 of FIG. 6. CFD 0 corresponds to a first zone of the detector from which a zone sum0 signal 622 is received from a summing circuit, such as summing circuit 730. Similar CFD circuits CFD 9 and CFD 16 are shown corresponding to zones that produce zone sum9 signal 624 and zone sum 16 signal 626, respectively. CFDs 1–8 and 10–15, and their corresponding circuitry are not shown in FIG. 7.

Trigger signal 628 output by CFD 0 feeds a clock input of programmable delay circuit 612. Programmable delay circuit 612 receives programming information in the form of delay data 618 which in one embodiment, is an 8 bit signal indicating a delay length. Delay data 618 is written to programmable delay 612 when write signal 620 is active. Q0 is the data output of programmable delay 612 and carries zone event detection signal 628a. Inverted output Q0 bar always carries a signal of the opposite logic state as signal 628a and is used to reset programmable delay 612.

Processor interface 604 is, in this embodiment, a field programmable gate array (FPGA) designed to interface with a bus of some standard protocol. In one embodiment, programmable interface 604 is a versa module eurocard (VME) interface for interfacing to host VME bus 640. In other embodiments, host bus 640 could be, for example, a peripheral component interface (PCI) bus or an extended industry standard architecture (EISA) bus. Processor interface 604 is connected to a detection processor through host bus 640. In one embodiment, the detection processor is part of detection circuit 132. In other embodiments, the detection processor could, for example, be part of detector assembly 102. A single zone of the detector is chosen as a reference zone and the timing of all other zone event trigger signals is calibrated with respect to the timing of the zone trigger event signal associated with the reference zone. In one embodiment, a zone that is approximately central to the trigger array is chosen as a reference zone. A centrally located zone may be preferable because an internal light source such as LED 408 or 404 will stimulate PMTs in the central zone regardless of location of the LED. CFD 9 receives zone sum9 signal 604 from a central zone of the detector. Trigger signal 630 is output from CFD 9 and input to programmable delay 614 in a manner like that of trigger signal 628.

CFDs and programmable delays are associated with each of 17 zones of the detector. For clarity, not all CFDs and programmable delays are shown. CFD 16 and programmable delay 616 are associated with the seventeenth zone of the detector.

For a calibration operation, the delay of programmable delay 614 is set initially to a nominal value. The nominal value is calculated based on known cable delays and component delays associated with the central reference zone. Reference zone event trigger signal 630a is processed differently than other zone event trigger signals. Specifically, signal 630a is transmitted to a clock input of a D flip-flop 650, whose data input is tied to a voltage source. The voltage source maintains a voltage appropriate to operate trigger calibration register 602. In some embodiments, trigger calibration register 602 is an emitter coupled logic (ECL) component (or several ECL components), because the fast switching times of ECL logic (in the picosecond range) allow calibration to sub-nanosecond accuracy. Trigger calibration register 602, in some embodiments, is a single register component, and in other embodiments is multiple register components. When signal 630a is active the signal on data input D is output as clock signal 634 to trigger calibration register 602.

In one embodiment, trigger calibration circuit 724 includes trigger calibration register 602 and D flip-flop 650. Zone event detection triggers from 16 of the 17 zones of the detector are directly input to trigger calibration register 602, while the reference zone detection trigger signal is transmitted to the D flip-flop and used to generate clock signal 634.

During calibration, an LED, such as LED 406 is activated so that all 17 PMTs of the detector are stimulated. The PMTs then generate zone sum signals and eventually zone event detection signals. Ideally, all zone event detection signals are generated simultaneously. In reality, however, this is not the case because of variance in component and cable delays. Signal 634, when active, clocks trigger calibration register 602 so that any active inputs of the register are output to lines 638 (0) through 638 (16) and transferred to processor interface 604. Processor interface 604, in turn, transmits the zone event detection trigger signals to the detection processor which determines whether each zone has reported with an active signal. If the flight time of a zone event trigger signal is too great or too small with respect to the flight time of signal 630a (associated with the reference zone) the signal will not appear as active.

In one embodiment, delays of all programmable delay circuits except programmable delay circuit 614 are initially set to a maximum delay value of which the programmable delay circuit is capable. In this way, if a signal is absent on signal lines 638, it is reasonably certain that the absent signal arrived too late rather than too early with respect to signal 630a and the delay can be reduced. In other embodiments, initial programmable delays could be set to a minimum value and the programmable delays could be increased as necessary. In that case, absent signals would most certainly have arrived too early to be detected at the same time as signal 630a. In either case, after analysis of the zone event trigger signals, processor interface 604 strobes programmable clear 636 to clear flip-flop 650 and trigger calibration register 602. This action prevents spurious signals from appearing on lines 638 between sampling cycles.

After analysis on signals of lines 638, processor interface 604 activates strobe control signal 652 to activate the LED and stimulate PMTs of the detector again. Zone event detection signals are then generated and sampled as previously described and delays are adjusted as necessary. Cycles of sampling trigger signals and adjusting delays continue until all zone event trigger signals appear active simultaneously on lines 638.

The circuit of FIG. 7 performs operations as described for a single detector. For multiple detectors, separate circuits such as the circuit of FIG. 7 could be associated with each detector. In some embodiments, detectors may share some circuit elements, for example, processor interface 604 could be shared between multiple detectors.

Figure 8A:
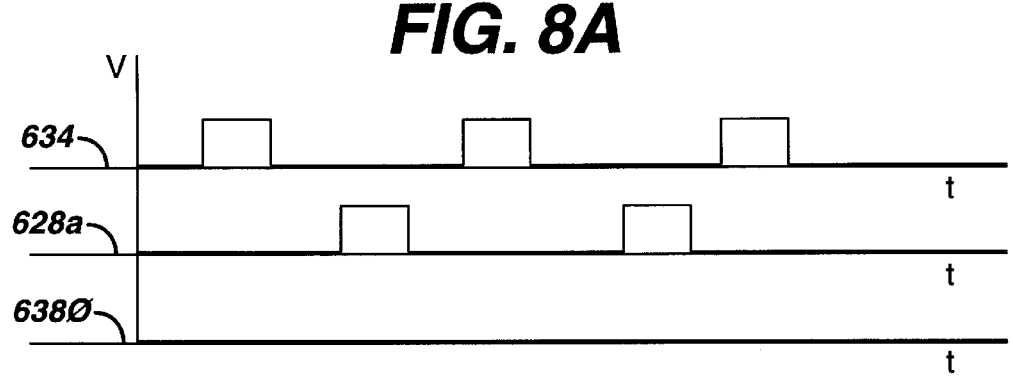
FIG. 8a is a timing diagram showing signals of FIG. 7.
Figure 8B:
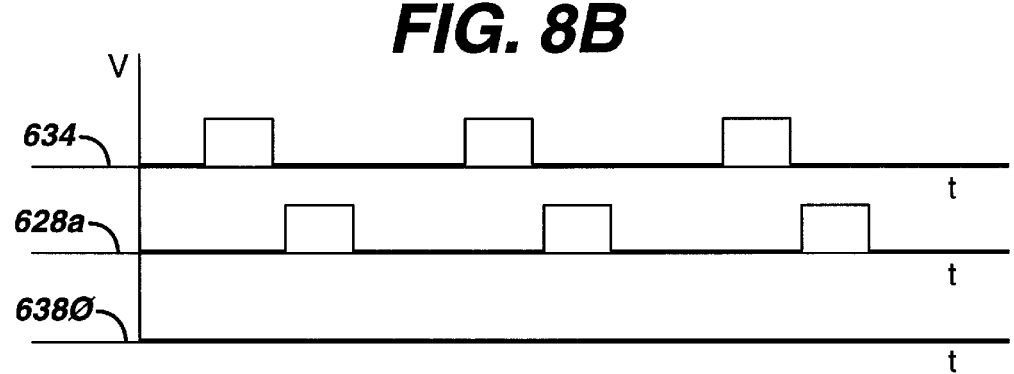
FIG. 8b is a timing diagram showing signals of FIG. 7.
Figure 8C:
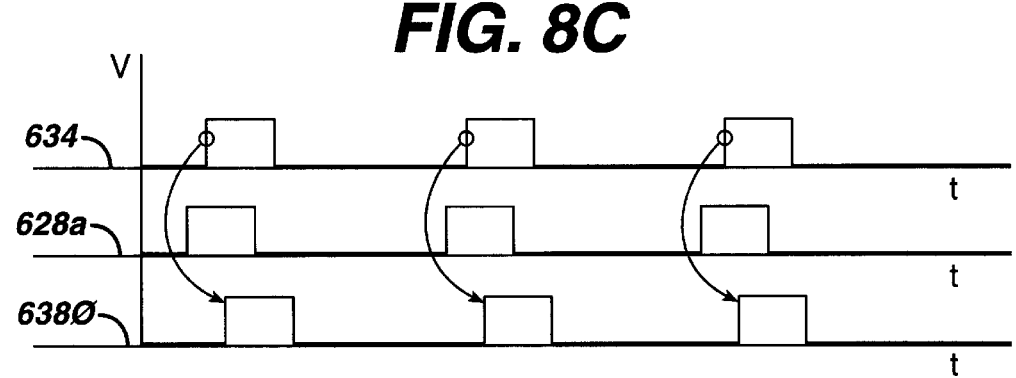
FIG. 8c is a timing diagram showing signals of FIG. 7.

FIGS. 8a, 8b, and 8c are timing diagrams that illustrate the adjustment of a programmable delay over several cycles to bring zone event detection signals into coincidence. FIG. 8a shows signal 634, the clock input to trigger calibration register 602, as a function of time. Zone event trigger signal 628a is a data input to trigger calibration register 602, and trigger signal 638 0, is the data output of trigger calibration register 602 that corresponds to signal 628a. In FIG. 8a, signal 634 is active for three consecutive periods of time, or three strobe cycles. Signal 628a is active for two cycles. Signal 628a, however, is active after the leading edge of the signal 634 pulses, so that the active signal 628a is not clocked into register 602. FIG. 8a illustrates the situation in which the delay of signal 628 is too great for a coincident event detected by both the reference zone and the zone associated with signal 628a to be detected and used as data in constructing an image.

FIG. 8b illustrates signal 634, 628a, and 638 0 after adjustment of the programmable delay of signal 628a. Signal 628a has been moved back to occur closer in time to active periods of signal 634, but signal 634 and 628a still do not occur together in the appropriate time window because signal 638 0 is still not active. FIG. 8c shows a subsequent cycle in which the delay of signal 628 has been decreased enough to bring signal 628a back far enough to satisfy the particular hold time of trigger calibration register 602. The hold time of trigger calibration register 602 is dependent upon the register device chosen. In the case of FIG. c, signal 638 0 is active, indicating that the zone associated with signal 628a is now satisfactorily calibrated with respect to the reference zone.

Figure 9:
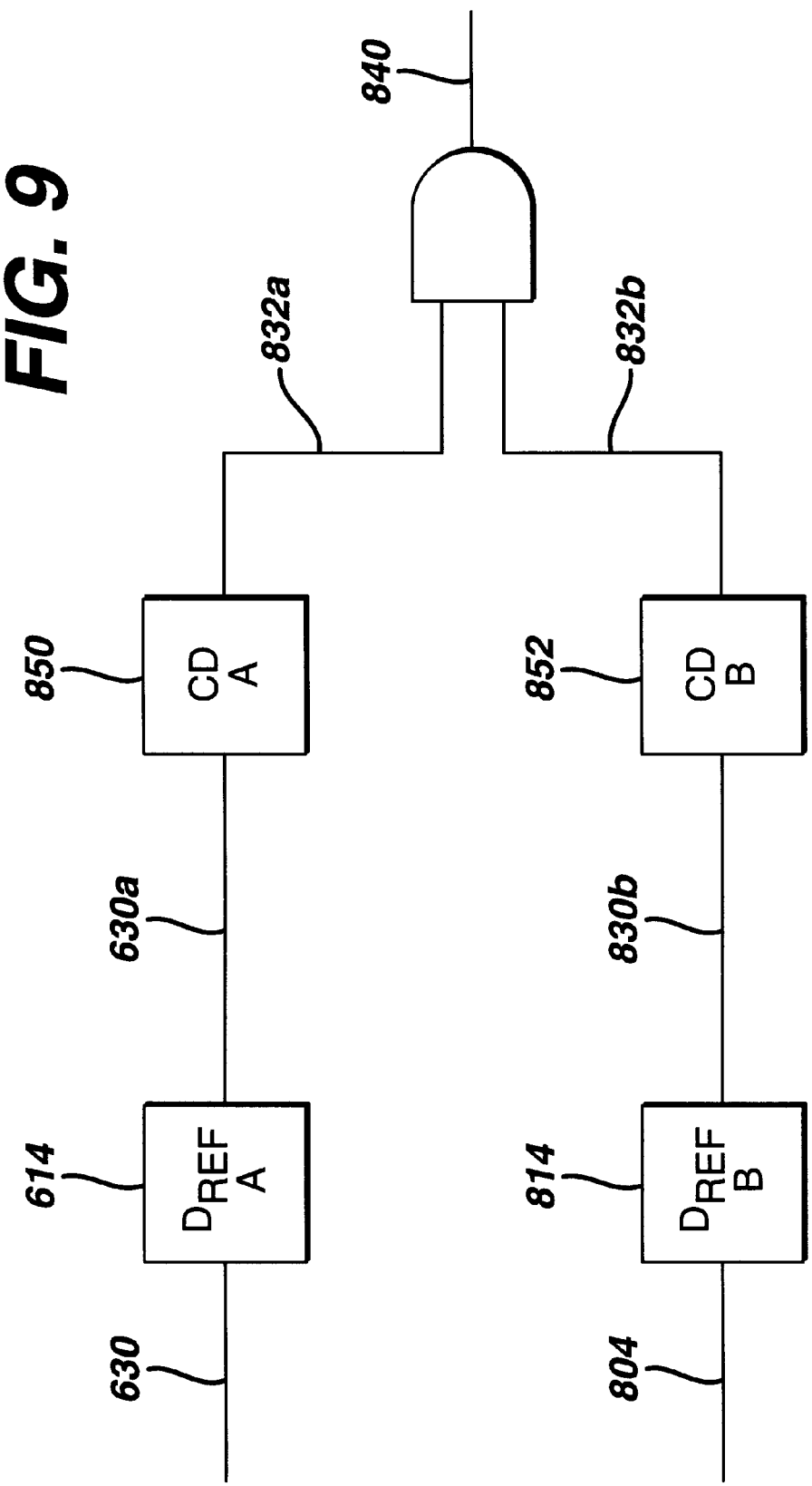
FIG. 9 is a circuit diagram of a portion of the event detection system of one embodiment

FIG. 9 is a block diagram of circuitry of coincidence timing circuit 720 according to one embodiment. After all zones of the detector have been calibrated with respect to the reference zone, an individual detector is considered independently calibrated. In the case of PET systems which rely on coincident events between multiple detectors it is still usually necessary to calibrate separate detectors with respect to each other. This is primarily due to difference in lengths of cables carrying detector trigger signals from each detector. The circuit of FIG. 9 is used to calibrate separate detectors with respect to each other after they are independently calibrated as briefly described with respect to FIGS. 7 and 8. Because the separate detectors have been independently calibrated with respect to their reference zones, it is only necessary to examine a single zone event trigger signal from each detector. In one embodiment, reference zone event trigger signals from each detector are used. In the case of FIG. 9, a detector A and a detector B are considered. The signals of FIG. 9 associated with detector A are also shown in FIG. 7.

Detector A trigger signal 630a of FIG. 7 is shown connected to programmable reference delay 614. Reference zone event trigger signal 630a is input to common delay A 850. Trigger signal 804 is from a corresponding detector B and is input to programmable reference delay 814. Reference zone event trigger signal 830b is input to common delay B 852. The outputs of common delay A 850 and common delay B 852 are delayed array trigger signal 832a and delayed array trigger signal 832b. Delayed array trigger signal 832a and delayed array trigger signal 832b are ANDed to produce coincidence signal 840. Coincidence signal 840 is input to processor interface 604 and monitored by the detection processor to determine whether common delay A 850 and/or common delay B 852 must be adjusted. If signal 840 is not active when an LED is stimulating PMTs of both detectors, then one or both of common delays of the common delay 850 and 852 must be adjusted.

FIG. 10 is a flow diagram of a method of calibrating event detectors according to one embodiment. According to this method, all detectors of the system are calibrated by first calibrating each detector independently. All detectors of a system may be calibrated simultaneously. After all detectors are independently calibrated, the detectors are calibrated with respect to each other. Blocks 902–914 as shown, describe independent calibration of a single detector, while blocks 916–924 describe "common" calibration of all detectors with respect to each other.

Initially, at block 902 a reference zone delay is initialized to a nominal value. The nominal value is calculated by accounting for known delays such as cable delays and component delays in the path of the trigger signal associated with the reference zone. At block 904, the delays of all the remaining zones of the detector are initialized to a maximum delay value possible with the programmable delay circuit. At block 906 the detector is activated by strobing an LED for a predetermined period of time so that all PMTs of the detector are artificially stimulated. At block 908 outputs of the trigger calibration register are analyzed. At block 910 it is determined whether expected signals from each of 16 detector zones are active on the outputs of the trigger calibration register. If all signals are not active, then the delays of those zones whose associated trigger signals are not active are adjusted at block 912.

At block 914 the trigger calibration register and the reference zone register are cleared. The reference zone register may be for example, a flip-flop such as flip-flop 650 of FIG. 7. Next, at blocks 906 and 908, the LED is strobed again and the trigger calibration register outputs are analyzed again. It is then determined whether all the trigger signals are active (block 910). If all trigger signals are active, then independent calibration of the detector is complete and common calibration can begin.

Block 916 describes the first operation in common calibration which involves positioning a radioactive point source between reference zones of multiple detectors. Because only reference zones of detectors are used in the common calibration process, it is not necessary to change the position of detectors with respect to the point source during calibration. At block 918, the rate of coincident events is monitored, and at block 920, the common delays associated with each detector are adjusted as necessary in order to maximize the coincidence rate. Once the common delays have been adjusted so as to maximize the coincidence rate, the offset of each reference delay is determined at block 922. In other words, an amount by which a reference delay has increased or decreased in the process of calibrating the common delay is determined for each detector. Then, at block 924, all "local" delays associated with individual zones are adjusted to reflect the offset of the reference delay of their associated reference zone.

Embodiments have been described which provide a method and apparatus for independently calibrating detectors for many types of event detection systems. Embodiments described include particular arrangements in a system, such as two detectors. Certain groupings of circuit components are also shown and described. However, numerous variations can be made upon these arrangements and groupings without departing from the spirit and scope of the claimed invention.

What is claimed is:

1. An event detector system, comprising:
   a first detector comprising a plurality of zones, each zone including a plurality of detector devices, wherein each zone generates a zone trigger signal when an event is detected by a detector device in the zone;
   a first energy source coupled to the first detector, such that when the first energy source is active, events occur that are detectable by the first detector; and
   a calibration circuit coupled to the first detector, wherein the calibration circuit performs timing calibration of zone trigger signals of zones of the first detector with respect to timing of a reference zone trigger signal of a predetermined reference zone of the first detector, and wherein the zone trigger signals and the reference zone trigger signal are generated when an event is detected,
   wherein the calibration circuit comprises a trigger calibration register, wherein a clock input of the trigger calibration register is coupled to the reference zone trigger signal and data inputs of the trigger calibration register are coupled to the zone trigger signals.

2. The system of claim 1, wherein data outputs of the trigger calibration register are coupled to the detection processor and wherein the detection processor analyzes the data outputs to determine if all of the zone trigger signals are active when the reference zone trigger signal is active.

3. The system of claim 2, further comprising a processor interface coupling the trigger calibration register and the detection processor.

4. The system of claim 3, further comprising a plurality of programmable delay circuits, each coupled to a zone of the detector and each outputting a zone trigger signal.

5. The system of claim 4, wherein a zone trigger signal of the reference zone is coupled to a clock input of a clocked storage device such that the clock input of the trigger calibration register is activated by an output of the clocked storage device when the zone trigger signal of the reference zone is active.

6. The system of claim 4, further comprising a plurality of constant fraction discriminator (CFD) circuits, each coupled between a zone of the first detector and a programmable delay circuit of the plurality of programmable delay circuits.

7. The system of claim 6, further comprising a second detector comprising a plurality of zones, each zone including a plurality of detector devices, wherein each zone generates a zone trigger signal when an event is detected by a detector device in the zone, and wherein the plurality of zones include a predetermined reference zone that generates a reference zone trigger signal when an event is detected in the reference zone.

8. The system of claim 7, further comprising a coincidence timing circuit, wherein the coincidence timing circuit comprises:
   a first common programmable delay coupled to a reference zone trigger signal of the first detector;
   a second common programmable delay coupled to a reference zone trigger signal of the second detector;
   circuitry coupled to an output of the first common programmable delay and to an output of the second common programmable delay such that the circuitry determines whether the reference zone trigger signal of the first detector and the reference zone trigger signal of the second detector are active simultaneously.

9. The system of claim 8, wherein the circuitry comprises an AND gate coupled to the receive the output of the first common programmable delay and the output of the second common programmable delay, wherein an output of the AND gate is coupled to the detection processor.

10. In an event detector system, an apparatus for independently calibrating multiple zone event detectors, comprising:
   a first clocked storage device coupled to receive zone trigger signals generated by a detector;
   a processor coupled to the first clocked storage device, wherein the processor analyzes output signals of the first clocked storage device to determine if zone trigger signals generated by the detector are received by the first clocked storage device within a predetermined time window;

a plurality of programmable delay devices, each coupled to delay a zone trigger signal and further coupled to the processor for receiving a delay data signal that sets a delay value of a programmable delay device; and a second clocked storage device coupled to a reference zone trigger signal of a detector and to the first clocked storage device such that when the reference zone trigger signal is active, the first clocked storage device outputs the zone trigger signals to the processor.

11. A method for independently calibrating multiple zone event detectors, comprising the steps of:

determining a signal delay of a reference zone trigger signal of a reference zone of a detector attributable to physical characteristics of a path of the reference zone trigger signal;

initializing a programmable delay of the reference zone trigger signal to compensate for the determined signal delay; and monitoring zone trigger signals of the detector to determine whether the zone trigger signals are active simultaneously with the reference zone trigger signal within a predetermined time window; and if at least one of the zone trigger signals is not active with the reference zone trigger signal within the predetermined time window, adjusting a programmable delay of the at least one zone trigger signal; and repeating the step of monitoring;

activating an energy source to stimulate zones of the detector, wherein the energy source causes zones of the detector to generate a plurality of zone trigger signals and a reference zone trigger signal; and transmitting the plurality of zone trigger signals to a trigger calibration register; and transmitting the reference zone trigger signal to a register, wherein when the reference zone trigger signal is active, the register transmits an active signal to a clock input of the trigger calibration register.

12. The method of claim 11, further comprising the steps of:

clearing the trigger calibration register; and clearing the register.

13. The method of claim 12, further comprising the step of initializing programmable delays of each of the plurality of zone trigger signals.

14. The method of claim 13, wherein the programmable delays of each of the plurality of zone trigger signals are each set to a maximum value.

15. The method of claim 13, wherein the programmable delays of each of the plurality of zone trigger signals are each set to a minimum value.

16. The method of claim 14, further comprising the steps of:

simultaneously stimulating multiple detectors such that at least two of the detectors detect the stimulus; and monitoring reference zone trigger signals of the at least two detectors to determine a rate of coincident detection between the at least two detectors.

17. The method of claim 16, further comprising the step of adjusting programmable delays of reference zone trigger signals of the at least two detectors until a maximum rate of coincident detection occurs.

18. The method of claim 17, wherein the step of stimulating includes placing a source of radiation so that the multiple detectors receive radiation.

19. The method of claim 17, further comprising the steps of:

transmitting the reference zone trigger signals of the at least two detectors to an AND gate; and transmitting an output of the AND gate to a processor, wherein the processor determines a current rate of coincident detection.

20. The method of claim 19, further comprising the steps of:

determining an adjustment amount by which the at least two reference zone trigger signals were adjusted to achieve the maximum rate of coincident detection; and adjusting zone trigger signals of each of the at least two detectors according to an adjustment amount of a corresponding reference zone trigger signal.

21. A radiation detector system comprising:

a radiation detector including a plurality of spatially-defined zones, each zone including a plurality of detector devices to detect radiation-induced events, wherein each zone generates a zone trigger signal when an event is detected by a detector device in the zone;

an energy source coupled to the radiation detector, to cause generation of the zone trigger signals and a reference zone trigger signal of a reference zone of the radiation detector when the energy source is active; and means for performing timing calibration of the zone trigger signals with respect to the reference zone trigger signal, wherein said means for performing timing calibration comprises:

a clocked storage device having a clock input coupled to the reference zone trigger signal and further having a plurality of data inputs, each data input coupled to a different one of the zone trigger signals, the clocked storage device further having a plurality of data outputs; and a detection processor to control the energy source and the calibration circuit, the detection processor coupled to receive the data outputs of the clocked storage device, wherein the detection processor analyzes the data outputs of the storage device to determine if all of the zone trigger signals are active when the zone trigger signal is active.

* * * * *